(12) United States Patent
Kaieda (10) Patent No.: US 9,667,822 B2
(45) Date of Patent: May 30, 2017

(54) RECORDING APPARATUS AND RECORDING METHOD

(71) Applicant: Seiko Epson Corporation, Tokyo (JP)

(72) Inventor: Teruaki Kaieda, Matsumoto (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 15/017,779

(22) Filed: Feb. 8, 2016

(65) Prior Publication Data

US 2016/0234397 A1 Aug. 11, 2016

(30) Foreign Application Priority Data

Feb. 9, 2015 (JP) ................. 2015-022928

(51) Int. Cl.
*H04N 1/034* (2006.01)
*H04N 1/00* (2006.01)

(52) U.S. Cl.
CPC ......... *H04N 1/034* (2013.01); *H04N 1/00721* (2013.01); *H04N 1/00732* (2013.01)

(58) Field of Classification Search
None
See application file for complete search history.

(56) References Cited

U.S. PATENT DOCUMENTS

| 2004/0239705 A1 | 12/2004 | Arikita | |
| 2007/0248367 A1* | 10/2007 | Fuchs | G03G 15/6526 399/16 |

FOREIGN PATENT DOCUMENTS

| JP | 2005-045644 A | | 2/2005 |
| JP | 2006076099 | * | 3/2006 |
| JP | 2013-022858 A | | 2/2013 |
| JP | 2013-083024 A | | 5/2013 |
| JP | 2013083024 | * | 5/2013 |
| WO | WO-03-031190 A1 | | 4/2003 |

* cited by examiner

*Primary Examiner* — Fan Zhang
(74) *Attorney, Agent, or Firm* — Harness, Dickey & Pierce, P.L.C.

(57) ABSTRACT

A recording apparatus includes a setting section on which it is possible to set a medium, a recording section that is capable of recording a recording image on a set medium, which is the medium that is set in the setting section on the basis of image data, a designation section that is capable of designating a recording position of the recording image on the set medium, and a control section that causes the recording image to be recorded on the set medium on the basis of the recording position that is designated by the designation section. In a recording apparatus with such a configuration, it is possible to suppress recording position shift of the recording image arises in accordance with setting position shift of a medium.

7 Claims, 9 Drawing Sheets

RECORDING APPARATUS AND RECORDING METHOD

BACKGROUND

1. Technical Field

The present invention relates to a recording apparatus and a recording method.

2. Related Art

In the related art, a recording apparatus that is capable of recording a recording image on a medium that is set in a setting section, is used. In such a recording apparatus, there are cases in which recording position shift of a recording image arises in accordance with setting position shift of a medium.

In such an instance, for example, International Publication No. WO2003/31190 discloses a recording apparatus (an ink jet printing apparatus) that aims to capture an image of a medium (a target printing object) that is set on a bed as a setting section, and suppress recording position shift of a recording image in accordance with setting position shift of a medium on the basis of data that is obtained by capturing an image with an imaging unit.

However, in the recording apparatus that is disclosed in WO03/31190, there are cases in which recording position shift of a recording image in accordance with setting position shift of a medium cannot be suitably suppressed as a result of shift in an attachment position of an imaging unit, blur during image capture or the like.

SUMMARY

An advantage of some aspects of the invention is to suppress recording position shift of a recording image in accordance with setting position shift of a medium.

According to a first aspect of the invention, there is provided a recording apparatus including a setting section on which it is possible to set a medium, a recording section that is capable of recording a recording image on a set medium, which is the medium that is set in the setting section, on the basis of image data, a designation section that is capable of designating a recording position of the recording image on the set medium, and a control section that causes the recording image to be recorded on the set medium on the basis of the recording position that is designated by the designation section.

In the recording apparatus, the designation section may be capable of designating the recording position by designating a designation position, which corresponds to a predetermined image position in the image data, on the set medium.

In the recording apparatus, a reception section that receives designation of an arbitrary image position in the image data may be further included, and the designation section may be capable of designating the recording position by designating a designation position, which corresponds to the arbitrary image position, on the set medium.

In the recording apparatus, the designation section may be capable of designating the recording position by designating a first designation position, which corresponds to a first image position in the image data, and a second designation position, which corresponds to a second image position in the image data, on the set medium.

In the recording apparatus, the designation section may be capable of designating a first designation position, which corresponds to a first image position in the image data, and a formation angle of the recording image with respect to the set medium.

In the recording apparatus, the designation section may be a pressure sensor that is provided on a setting surface of the medium in the setting section, and may be capable of designating the recording position as a result of being pressed.

In the recording apparatus, the designation section may be capable of acquiring positional information at a facing position, which faces the setting surface of the medium in the setting section, and may be capable of designating the recording position by transmitting the positional information to the control section.

According to a second aspect of the invention, there is provided a recording method in a recording apparatus that is provided with a setting section on which it is possible to set a medium, and a recording section that is capable of recording a recording image on a set medium, which is the medium that is set in the setting section, on the basis of image data, the method including designating a recording position of the recording image on the set medium, and recording the recording image in the designated recording position.

According to the aspects of the invention, it is possible to suppress recording position shift of the recording image in accordance with setting position shift of the medium.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, recording apparatuses according to embodiments of the invention will be described in detail with reference to the appended drawings.

Embodiment 1

FIGS. 1 to 8

Firstly, a recording apparatus according to Embodiment 1 of the invention will be described.

Figure 1:
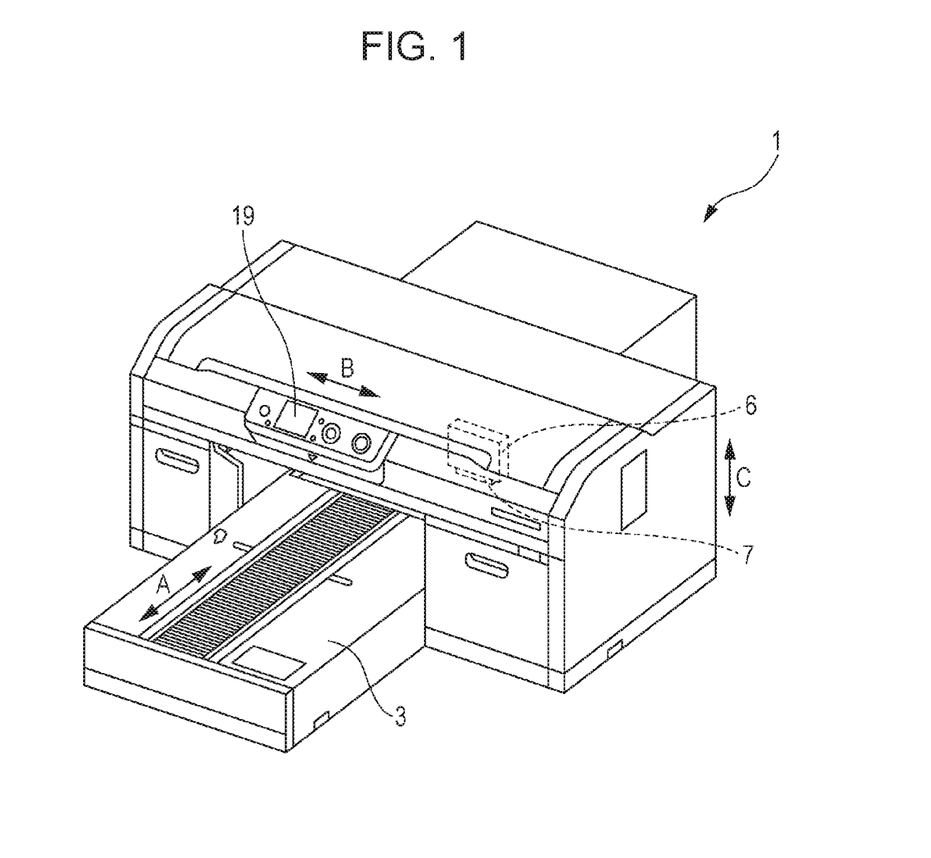
FIG. 1 is a schematic perspective view of a recording apparatus according to Embodiment 1 of the invention.
Figure 2:
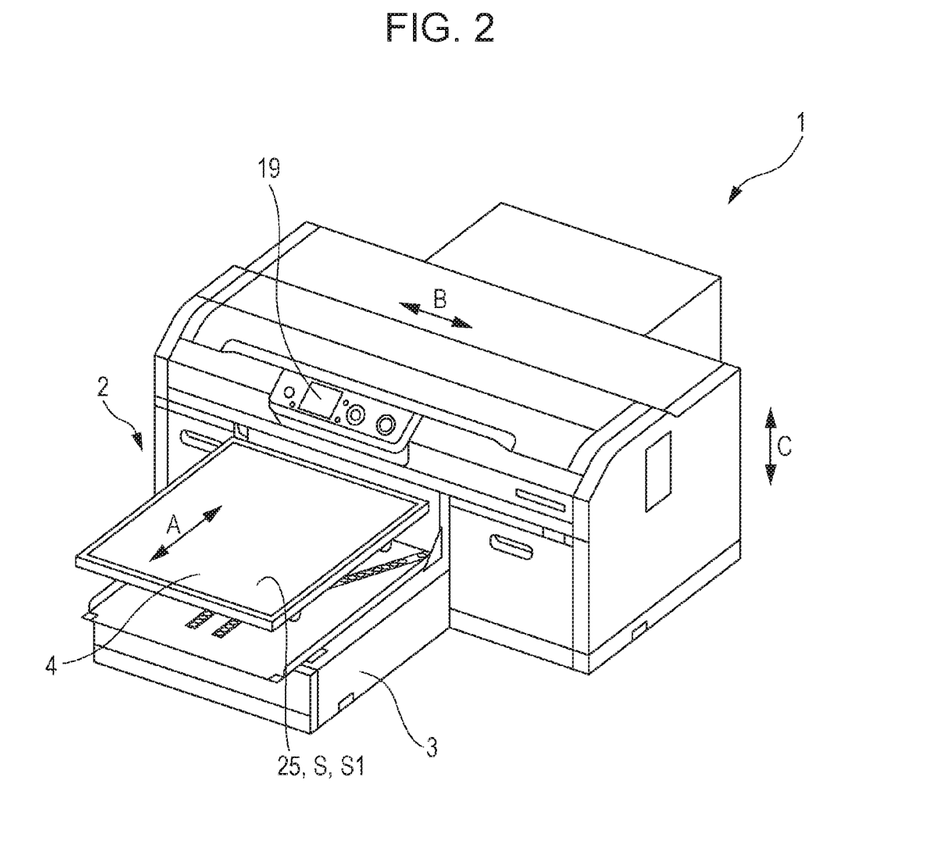
FIG. 2 is a schematic perspective view of the recording apparatus according to Embodiment 1 of the invention.

FIGS. 1 and 2 are schematic perspective views of a recording apparatus 1 of Embodiment 1 of the invention, and of these, FIG. 1 shows a state in which a tray 4, as a setting section of a medium M (refer to FIGS. 5A and 5B) of the recording apparatus 1 of the present embodiment, is in a recording initiation position, and FIG. 2 shows a state in which the tray 4 is in a setting position of the medium M.

Figure 3:
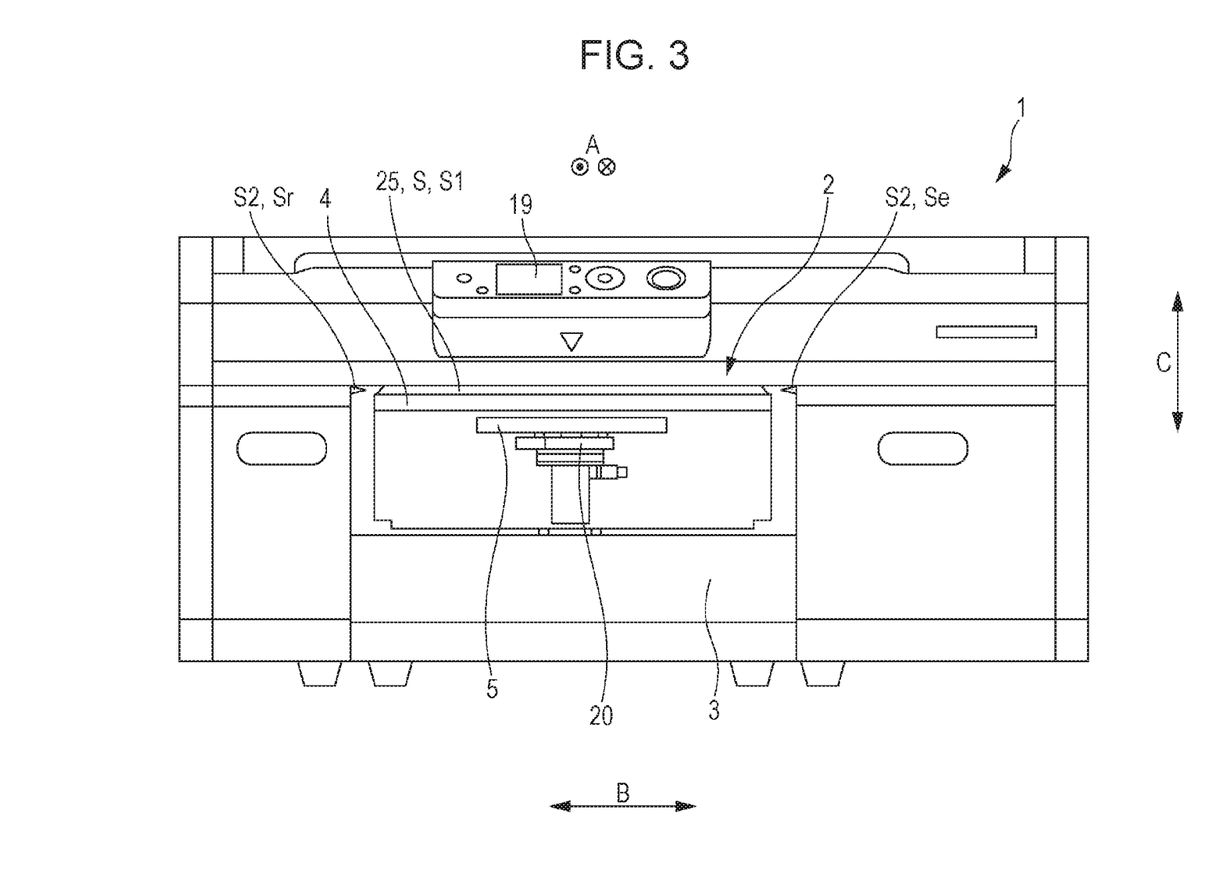
FIG. 3 is a schematic front view of the recording apparatus according to Embodiment 1 of the invention.

In addition, FIG. 3 is a schematic front view of the recording apparatus 1 of the present embodiment.

The recording apparatus 1 of the present embodiment is provided with a medium support unit 2, which moves in a movement direction A in a state of supporting the medium M. The medium support unit 2 includes the tray 4, which is a setting section on which it is possible to set the medium M, and is also a support section. The recording apparatus 1 is provided with a medium transport section 3 that transports the medium M that is supported by the tray 4 in the movement direction A. In addition, the tray 4 is mounted on a stage 5. The tray 4 moves in a height direction C with the stage 5 as a result of a rotational lever 20 being rotated.

Additionally, although described in more detail later, a pressure sensor S1 is provided on a setting surface 25 of the medium M on the tray 4, and has a configuration in which it is possible for a control section 8 (refer to FIG. 4) to ascertain which position on the setting surface 25 a pressurized position is as a result of the setting surface 25 being pressed.

In addition, a recording head 7 that is capable of recording on the medium M by discharging an ink, is provided in a main body inner section of the recording apparatus 1. In the present embodiment, the recording head 7 is equivalent to a recording section that is capable of recording a recording image Pi (refer to FIG. 6) on a set medium M1 (refer to FIG. 5B), which is a medium M that is set on the tray 4. Further, the recording apparatus 1 of the present embodiment forms a desired recording image Pi by discharging an ink from the recording head 7 onto the set medium M1 that is supported by the tray 4 while causing the recording head 7 to reciprocate in an intersecting direction B, which intersects the movement direction A, as a result of causing a carriage 6, in which the recording head 7 is provided, to reciprocate in the intersecting direction B. Additionally, the recording apparatus 1 of the present embodiment records while moving the tray 4 to a front side, in which the front side (the lower left direction) in FIGS. 1 and 2 is a setting position (refer to FIG. 2) of the medium M on the tray 4, after moving the tray 4, on which the medium M is set, to a recording initiation position (refer to FIG. 1) of a deep side (the upper right direction) in FIGS. 1 and 2.

Additionally, the recording apparatus 1 of the present embodiment is provided with the recording head 7, which records while reciprocating in the intersecting direction B, but may be provided with a so-called line head, in which a plurality of nozzles that discharge an ink, are provided in the intersecting direction B that intersects the movement direction A.

In this instance, the term "line head" refers to a recording head that is used in a recording apparatus, in which a region of nozzles that are formed in the intersecting direction B, which intersects the movement direction A of the medium M, is provided so as to be capable of covering the entire intersecting direction B of the medium M, and which forms the recording image Pi by relatively moving the recording head or the medium M. Additionally, the region of the nozzles of the line head intersecting direction B need not be capable of covering the entire intersecting direction B of the medium M that the recording apparatus handles.

In addition, the recording head 7 of the present embodiment is a recording section that is capable of recording on the medium M by discharging an ink, but is not limited to this kind of recording section, and for example, may use a transfer type recording section that records by transferring a color material onto the medium M.

In addition, as shown in FIG. 3, the recording apparatus 1 of the present embodiment is provided with a PG (an interval between the medium M that is supported by the tray 4 and the recording head 7) sensor S2, and has a configuration that can detect the presence or absence of an abnormal PG (the interval between the medium M and the recording head 7 being too narrow).

In this instance, the pressure sensor S2 includes an emission light section Se and a reception light section Sr. Further, the PG sensor S2 has a configuration that irradiates light from the emission light section Se toward the light section Sr, and detects the presence or absence of an abnormal PG on the basis of whether or not the light is received by the light section Sr. However, the configuration of the PG sensor is not limited.

In addition, the recording apparatus 1 of the present embodiment is provided with an operation panel 19, which receives various operations related to recording.

Next, an electrical configuration of the recording apparatus 1 of the present embodiment will be described.

Figure 4:
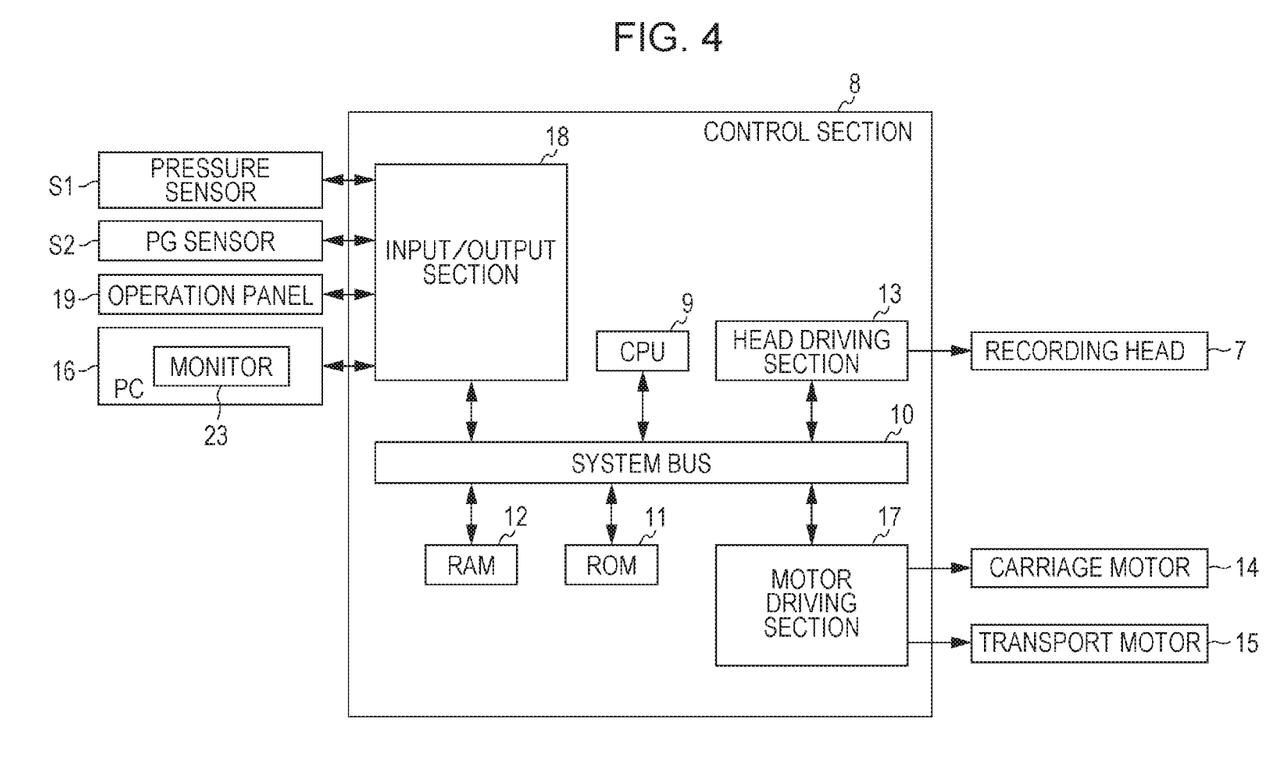
FIG. 4 is a block diagram of the recording apparatus according to Embodiment 1 of the invention.

FIG. 4 is a block diagram that shows of the recording apparatus 1 of the present embodiment.

A CPU 9 that manages the overall control of the 1 is provided in the control section 8. The CPU 9 is connected to a ROM 11, in which various programs and maintenance sequences that the CPU 9 executes are stored, and a RAM 12 that is capable of temporarily storing data via a system bus 10.

In addition, the CPU 9 is connected to a head driving section 13 for driving the recording head 7 via the system bus 10.

In addition, the CPU 9 is connected to a motor driving section 17 via the system bus 10. Further, the motor driving section 17 is connected to a carriage motor 14 for moving the carriage 6 in which the recording head 7 is provided, and a transport motor 15 in which the medium transport section 3 for transporting the medium M, is provided.

Furthermore, the CPU 9 is connected to an input-output section 18 via the system bus 10, and the input-output section 18 is connected to the pressure sensor S1, the PG sensor S2, the operation panel 19, and a PC 16, which includes a monitor 23, for performing the transmission and reception of data such as image data I (refer to FIG. 7) and signals.

In the manner described above, the recording apparatus 1 of the present embodiment is provided with the tray 4, which is a setting section on which it is possible to set the medium M. In other words, the recording apparatus 1 is provided with a setting section 4 on which it is possible to set the medium M. At this time, a medium M that is in a state of being set in the setting section 4 will be referred to as a set medium M1. In addition, the recording apparatus 1 is provided with a recording head 7 that is capable of recording the recording image Pi on the set medium M1, which is a medium M that is set in the tray 4, on the basis of image data I. In other words, the recording apparatus 1 is provided with a recording section 7 that is capable of recording the recording image Pi on the set medium M1, which is a medium M that is set in the setting section 4, on the basis of image data I.

In this instance, the pressure sensor S1 includes a role as a designation section S that is capable of designating a recording position of the recording image Pi on the set medium M1. Further, the control section 8 can perform control so that the recording image Pi is recorded in the recording position that is designated by the pressure sensor S1. In other words, the control section 8 causes the recording image Pi to be recorded on the set medium M1 on the basis of the recording position that is designated by the designation section S.

Therefore, even in a case in which setting position shift of the medium M with respect to the tray 4, arises, it is possible to suppress recording position shift of the recording image Pi in accordance with setting position shift of the medium M by designating the recording position using the pressure sensor S1. Furthermore, it is also possible to record by changing the recording position to a preferred position of a user as a result of designating the recording position using the pressure sensor S1.

Additionally, in this instance, in addition to a meaning of "a location at which recording is performed on the set medium M1", the term "recording position" may also be an "angle at which recording is performed with respect to the set medium M1".

In addition, if phrased in a different manner, it is possible to execute a designation process of designating the recording position of the recording image Pi on the set medium M1, and a recording process of recording the recording image Pi in the recording position that is designated in the designation process, using the recording apparatus 1 of the present embodiment. In other words, the recording method according to the present embodiment is a recording method in a recording apparatus that is provided with the setting section 4 on which it is possible to set the medium M, and the recording section 7 that is capable of recording the recording image Pi on the set medium M1, which is the medium M that is set in the setting section 4, on the basis of the image data I, and the recording method designates the recording position of the recording image Pi on the set medium M1, and records the recording image Pi on the set medium M1 on the basis of the designated recording position.

Therefore, even in a case in which setting position shift of the medium M, arises, it is possible to suppress recording position shift of the recording image Pi in accordance with setting position shift of the medium M, and it is possible to record by changing the recording position to a preferred position of a user.

Hereinafter, a designation method of the recording position using the pressure sensor S1 will be described.

Figure 5A:
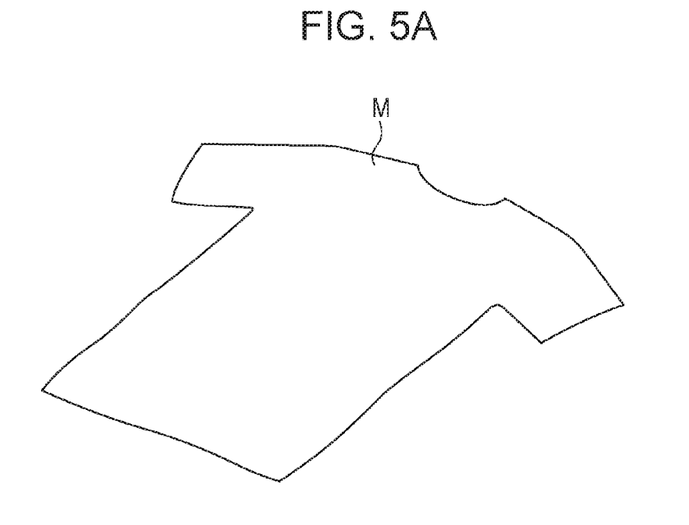
FIGS. 5A and 5B are schematic perspective views that show a medium that is capable of being used in the recording apparatus according to Embodiment 1 of the invention.
Figure 5B:
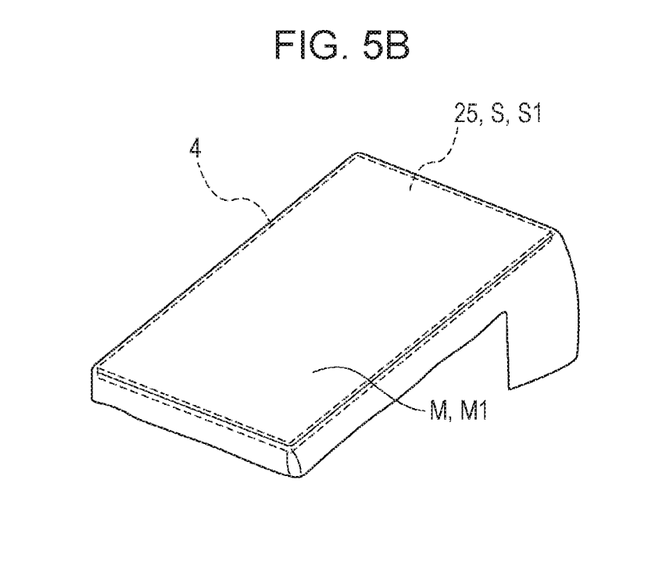

In this instance, FIGS. 5A and 5B are schematic perspective views that show the medium M that is capable of being used in the recording apparatus 1 of the present embodiment, and among these, FIG. 5A shows a state before setting on the tray 4, and FIG. 5B shows a set state on the tray 4.

Figure 6:
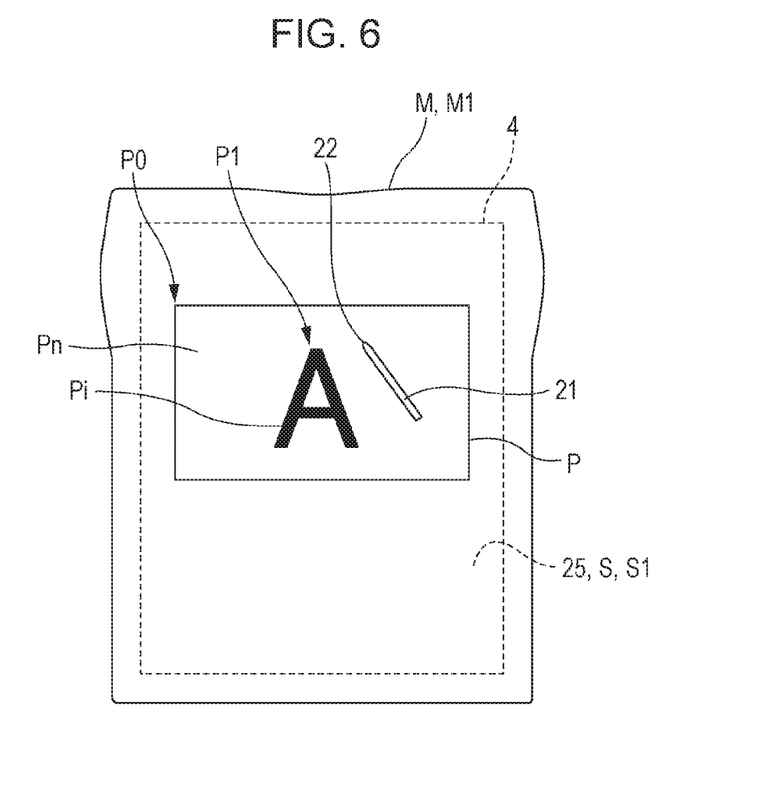
FIG. 6 is a schematic plan view that shows a state in which a medium is set in the recording apparatus according to Embodiment 1 of the invention.

In addition, FIG. 6 is a schematic plan view that shows a state in which the medium M is set in the recording apparatus 1 of the present embodiment.

Figure 7:
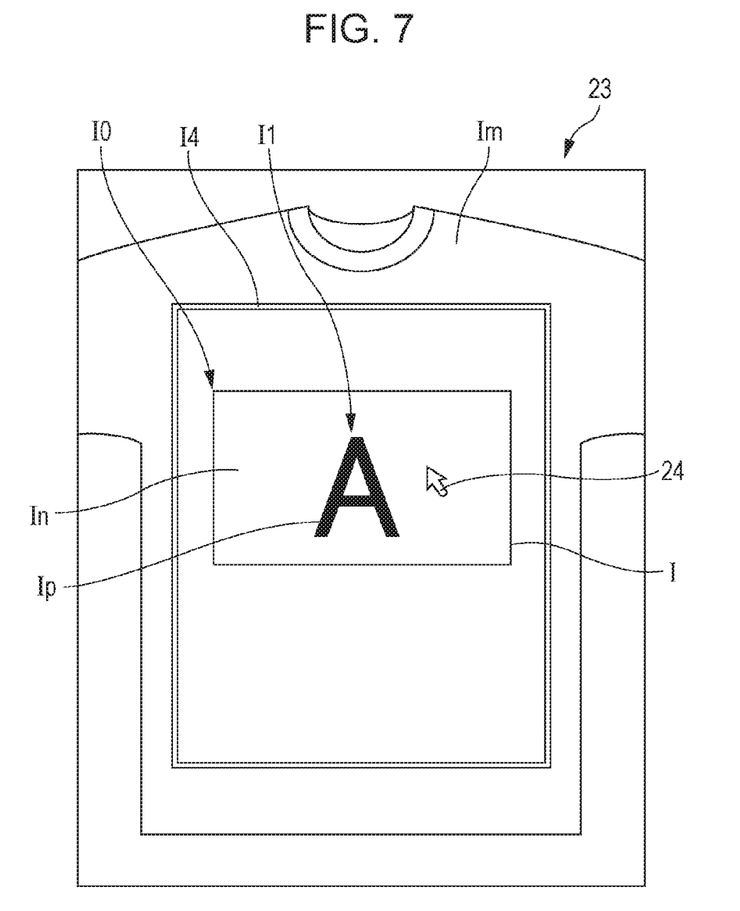
FIG. 7 is a schematic view that shows a state in which a medium is set on the monitor of a PC that can be used with the recording apparatus according to Embodiment 1 of the invention.

In addition, FIG. 7 is a schematic view that shows a display example of a state in which the medium M is set on the monitor 23 of the PC 16 that can be used with the recording apparatus 1 of the present embodiment.

Figure 8A:
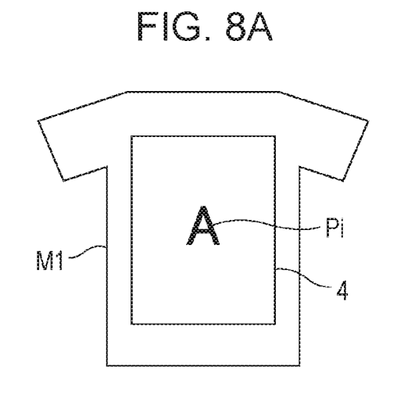
FIGS. 8A to 8D are views for describing the designation of a recording position, which is executed using the recording apparatus according to Embodiment 1 of the invention.
Figure 8B:
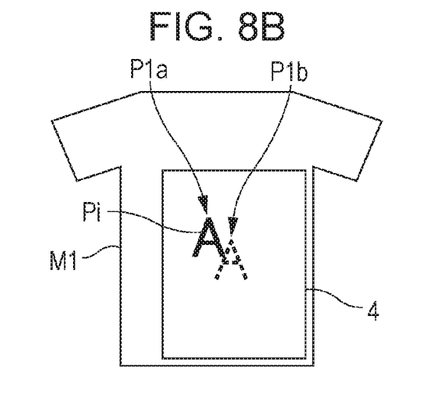
Figure 8C:
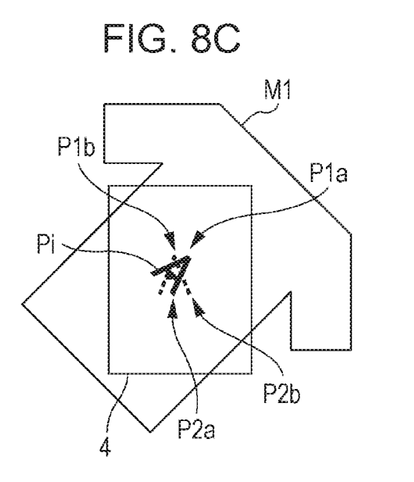
Figure 8D:
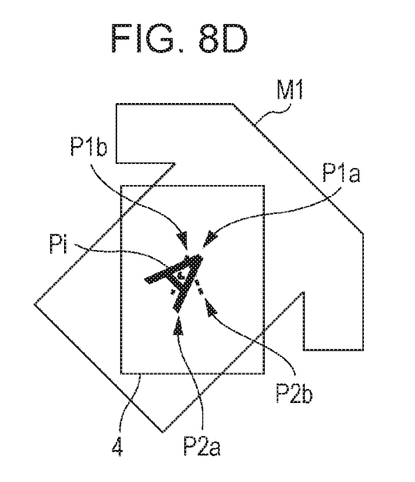

Further, FIGS. 8A to 8D are views for describing the designation of a recording position, which is executed using the recording apparatus 1 of the present embodiment. Among these, FIG. 8A shows a state in which there is no setting position shift of the medium M, and the recording image Pi is formed on the set medium M1 without performing the designation of the recording position. In addition, FIG. 8B shows a state in which there is setting position shift of the medium M (shift in the location of a set portion), and the recording image Pi is formed on the set medium M1 by changing the recording position (the location at which recording is performed). In addition, FIG. 8C shows a state in which there is setting position shift of the medium M (shift in the angle at which setting is performed), and the recording image Pi is formed on the set medium M1 by changing the recording position (the angle of the recording image Pi at which recording is performed). In addition, FIG. 8D shows a state in which there is setting position shift of the medium M (shift in the angle at which setting is performed), and furthermore, the recording image Pi is formed on the set medium M1 by changing the recording position (the angle of the recording image Pi at which recording is performed), and the size of the recording image Pi.

In the abovementioned manner, the recording apparatus 1 of the present embodiment has a configuration in which the pressure sensor S1 is provided on a setting surface 25 of the medium M on the tray 4, and in which it is possible for the control section 8 to ascertain which position on the setting surface 25 a pressed position is as a result of the setting surface 25 being pressed.

To explain in further detail, the recording apparatus 1 of the present embodiment is capable of designating the recording position as a result of the setting surface 25, on which the pressure sensor S1 is provided being pressed via the set medium M1 that is set on the tray 4 by a finger of a user, a tip end section 22 of a touch pen 21 such as that shown in FIG. 6, or the like.

For example, the pressure sensor S1 is capable of designating the recording position as a result of designating a designation position P0 and a designation position P1 such as those shown in FIG. 6, which correspond to predetermined image position I0 and image position I1 in the image data I that is displayed on the monitor 23 such as that shown in FIG. 7, on the set medium M1 (that is, a user pressing with the touch pen 21 or the like). In other words, the designation section S is capable of designating a recording position as a result of designation positions (P0 and P1), which correspond to predetermined image positions (I0 and I1) in the image data I, being designated on the set medium M1.

In this instance, the image data I in FIG. 7 includes image data Ip, which correspond to a portion on which recording is to be performed, and image data In, which correspond to a portion on which recording is not to be performed. Further, in this instance, the image position I0 is equivalent to a position of the data of a pixel of an end section in the image data I, and the image position I1 is equivalent to a position of the data of a pixel of an end section in the image data Ip (a portion of the recording image Pi that corresponds to a portion to be recorded first).

In addition, an image range P in FIG. 6 shows a range that corresponds to the image data I, and includes the recording image Pi to be recorded in correspondence with the image data Ip, and a non-recording image Pn not to be recorded in correspondence with the image data In. That is, in a practical sense, the image to be recorded on the image range P is only the recording image Pi. Further, the designation position P0 corresponds to the image position I0, and the designation position P1 corresponds to the image position I1.

In this manner, by establishing a predetermined image position in advance, it is possible to easily designate a recording position in a single step of designating the designation positions with the pressure sensor S1. For example, it is possible to record the recording image Pi with a pressed portion as the designation position P1 (a portion to be recorded first) by establishing a predetermined image position as the image position I1 (a portion that corresponds to a portion of the recording image Pi to be recorded first) in advance, and pressing the setting surface 25 with the touch pen 21 or the like.

Additionally, without being particularly limited to "a predetermined image position", for example, in the manner of the present embodiment, it is possible to set the image position I0, which corresponds to the data of a pixel of an end section in the image data I, the image position I1 of a portion that corresponds to a portion of the recording image Pi to be recorded first, or the like.

In addition, a user can designate an arbitrary image position of the image data with a pointer 24 using the PC 16. In this instance, the recording apparatus 1 of the present embodiment can receive the corresponding image position in the control section 8, which has a role as a reception section. In other words, the recording apparatus 1 is provided with a reception section 8, which receives designation of an arbitrary image position in the image data I. Further, the pressure sensor S1 is capable of designating the recording position as a result of a designation position, which corresponds to the corresponding image position on the set medium M1, being designated (that is, a user pressing with the touch pen 21 or the like). In other words, the designation section S is capable of designating a recording position as a result of a designation position, which corresponds to an arbitrary position on the set medium M1, being designated.

In this manner, the pressure sensor S1 of the present embodiment is capable of designating the recording position as a result of a designation position, which corresponds to an arbitrary image position that the control section 8 received, being designated. That is, for example, it is possible to designate a preferred recording position of a user as a result of the user designating the image position I1 as an arbitrary image position on the monitor 23, and designating the designation position P1, which corresponds to the designated image position I1, with the pressure sensor S1 (pressing with the touch pen 21 or the like).

When described from a different viewpoint using FIGS. 8A and 8B, the abovementioned designation example of the recording apparatus (the designation example of the designation position P1, which corresponds to the image position I1) is as follows.

In a case in which there is no setting position shift of the medium M, and therefore, it is not necessary to perform designation of the recording position, as shown in FIG. 8A, the recording image Pi is formed in the vicinity of the center, which is a desired location, of the set medium M1.

However, as shown in FIG. 8B, in a case in which there is setting position shift of the medium M (shift in the location of a set portion), it is necessary to form the recording image Pi on the set medium M1 by changing the recording position (the location at which recording is performed). The reason for this is that the recording image Pi is formed in a location (a location that is not the vicinity of the center, which is the desired location) that is shown by a broken line if the location at which recording is performed is not changed. In such an instance, it is possible to form the recording image Pi in the vicinity of the center, which is the desired location, of the medium M by setting a position of the designation position P1 to a position P1a after change from a position P1b before change (a reference state).

Additionally, in the designation example of the present recording position, the vicinity of the center of the medium M is designated as the recording position, but the designation position is not particularly limited, and may be the vicinity of an end section of the medium M, or the like. In addition, in a case in which at least a portion of the desired recording image Pi is shifted from a recording range of the medium M as a result of setting the designation position to the vicinity of an end section of the medium M, this fact may be reported using the operation panel 19, the monitor 23 or the like.

In addition, in the recording apparatus 1 of the present embodiment, the pressure sensor S1 is capable of designating a first designation position (for example, a portion of the recording image Pi to be recorded first) in an image range P, which corresponds to a first image position (for example, a portion of the image data Ip that corresponds to a portion of the recording image Pi to be recorded first) in the image data I, and a formation angle of the recording image Pi with respect to the set medium M1. In other words, the designation section S is capable of designating a first designation position, which corresponds to a first image position, and a formation angle of the recording image Pi with respect to the set medium M1.

More specifically, by designating a first designation position and a second designation position (for example, a portion of the recording image Pi to be recorded last), it is possible to establish the recording position with the first designation position as a reference. Further, it is possible to establish a formation angle of the recording image Pi with respect to the set medium M1 on the basis of a designation position straight line that links the first designation position and the second designation position, and an image position straight line that links the first image position, which corresponds to the first designation position of the image data I, and a second image position, which corresponds to the second designation position.

Therefore, in addition to it being possible to suppress shifting of a recording location of the recording image Pi in accordance with setting position shift of the medium M, it is possible to adjust the recording image Pi to be formed on the set medium M1 to a preferred formation angle of a user.

For example, as shown in FIG. 8C, in a case in which there is setting position shift of the medium M (shift in the angle at which setting is performed), it is necessary to form the recording image Pi on the set medium M1 by changing the formation angle of the recording image Pi. The reason for this is that the recording image Pi is formed at an angle (an angle that is not a desired angle) that is shown by a broken line if the formation angle of the recording image Pi is not changed. In such an instance, in a case in which the first designation position is set as the designation position P1 (a portion to be recorded first), and the second designation position is set as the designation position P2 (a portion to be recorded last), it is possible to form the recording image Pi at a desired angle and in a desired location with respect to the medium M by setting a position of the first designation position P1 to a position P1a after change from a position P1b before change (a reference state), and setting a position of the second designation position P2 to a position P2a after change from a position P2b before change (a reference state).

In addition, in the recording apparatus 1 of the present embodiment, the pressure sensor S1 is capable of designating the recording position by designating a first designation position (for example, a portion of the recording image Pi to be recorded first) in an image range P, which corresponds to a first image position (for example, a portion of the image data Ip that corresponds to a portion of the recording image Pi to be recorded first) in the image data I, and a second designation position (for example, a portion of the recording image Pi to be recorded last) in an image range P, which corresponds to a second image position (for example, a portion of the image data Ip that corresponds to a portion of the recording image Pi to be recorded last) in the image data I, on the set medium M1. In other words, the designation section S is capable of designating a recording position as a result of the first designation position, which corresponds to the first image position in the image data I, and the second designation position, which corresponds to the second image position in the image data I, being designated on the set medium M1. Therefore, in addition to it being possible to suppress recording position shift of the recording image Pi in accordance with setting position shift of the medium M, it is possible to adjust the recording image Pi to be formed on the set medium M1 to a preferred size and formation angle of a user.

For example, as shown in FIG. 8D, in a case in which there is setting position shift of the medium M (shift in the angle at which setting is performed), it is necessary to form the recording image Pi on the set medium M1 by changing the formation angle of the recording image Pi. The reason for this is that the recording image Pi is formed at an angle (an angle that is not a desired angle) that is shown by a broken line if the formation angle of the recording image Pi is not changed. In such an instance, in a case in which the first designation position is set as the designation position P1 (a portion to be recorded first), and the second designation position is set as the designation position P2 (a portion to be recorded last), it is possible to form the recording image Pi at a desired angle and in a desired location with respect to the medium M by setting a position of the first designation position P1 to a position P1a after change from a position P1b before change (a reference state), and setting a position of the second designation position P2 to a position P2a after change from a position P2b before change (a reference state). Furthermore, as shown in FIG. 8D, since the two designation positions of the first designation position and the second designation position are designated, it is possible to form the recording image Pi at a preferred size (magnification) of a user.

In this instance, in the recording apparatus 1 of the present embodiment, the designation section is the pressure sensor S1 that is provided on the setting surface 25 of the medium M in the tray 4, and has a configuration that is capable of designating a recording position of the recording image Pi as a result of being pressed. In other words, the designation section S is the pressure sensor S1 that is provided on the setting surface of the medium M in the tray 4, and has a configuration that is capable of designating a recording position as a result of being pressed. Therefore, it is possible to easily designate the recording position of the recording image Pi. However, the designation section S is not limited to a designation section with such a configuration. Hereinafter, an embodiment of a recording apparatus that is provided with a designation section with a different configuration to that of the recording apparatus 1 of the present embodiment will be described.

Embodiment 2

FIG. 9

Next, a recording apparatus according to Embodiment 2 of the invention will be described.

Figure 9:
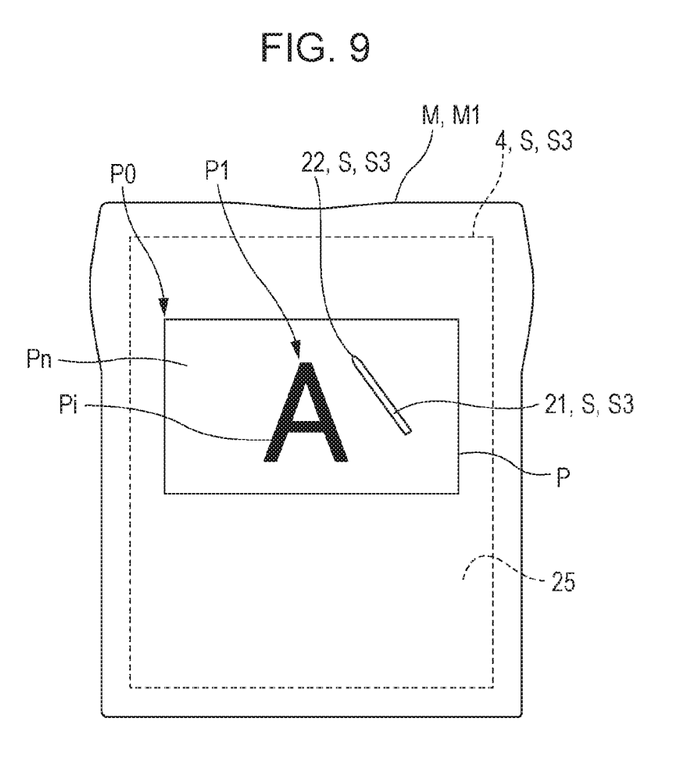
FIG. 9 is a schematic plan view that shows a state in which a medium is set in the recording apparatus according to Embodiment 2 of the invention.

FIG. 9 is a schematic plan view that shows a state in which the medium M is set in the recording apparatus 1 according to Embodiment 2 of the invention, and is a view that corresponds to FIG. 6 of Embodiment 1. Additionally, the same reference numerals will be given to constituent members that are shared with the abovementioned Embodiment 1, and detailed description thereof will be omitted.

The recording apparatus 1 of the present embodiment only differs from the recording apparatus 1 of Embodiment 1 in the configuration of the designation section S (S3).

In the recording apparatus 1 of the present embodiment, the designation section S is configured by the tray 4 and the touch pen 21. To explain in further detail, the touch pen 21 is capable of acquiring positional information (positional information of the tip end section 22 of the touch pen 21 with respect to the tray 4) at a facing position, which faces the setting surface 25 of the medium M in the tray 4, as the setting section, is capable of transmitting the positional information to the control section 8, and is capable of designating the recording position of the recording image Pi by transmitting the positional information to the control section 8. In other words, the designation section S is capable of acquiring positional information at a facing position, which faces the setting surface 25 of the medium M in the setting section 4, and is capable of designating the recording position by transmitting the positional information to the control section 8. Therefore, the recording apparatus 1 of the present embodiment can also easily designate the recording position of the recording image Pi.

Additionally, the designation section S of the present embodiment has a configuration that acquires the positional information by transmitting and receiving electromagnetic waves, but is not particularly limited as a configuration that is capable of acquiring the positional information. A configuration that uses a GPS (Global Positioning System), which receives radio waves that a satellite emits, or a configuration that uses various sensors such as a gyrosensor, an acceleration sensor or the like, may be used.

Additionally, the invention is not limited to the abovementioned embodiments, various alterations are possible within the range of the invention that is disclosed in the claims, and, naturally, such alterations are also included within the scope of the invention.

The invention has been described in detail above on the basis of specific embodiments. In this instance, the invention will be summarized once more.

The recording apparatus 1 of the first aspect of the invention is a recording apparatus including the setting section 4, the recording section 7 that is capable of recording the recording image Pi on the set medium M1, which a state in which the medium M is set in the setting section 4, on the basis of image data I, the designation section S that is capable of designating the recording position of the recording image Pi on the set medium M1, and the control section 8 that performs control so that the recording image Pi is recorded in the recording position that is designated by the designation section S.

In this instance, in addition to a meaning of "a location at which recording is performed on the set medium M1", the term "recording position" may also be an "angle at which recording is performed with respect to the set medium M1".

According to the aspect, the recording apparatus 1 is provided with the designation section S that is capable of designating the recording position of the recording image Pi on the set medium M1, and the control section 8 that performs control so that the recording image Pi is recorded in the recording position that is designated by the designation section S. Therefore, even in a case in which setting position shift of the medium M, arises, it is possible to suppress recording position shift of an image in accordance with setting position shift of the medium M by designating the recording position using the designation section S. Furthermore, it is also possible to record by changing the recording position to a preferred position of a user as a result of designating the recording position using the designation section S.

In the recording apparatus 1 of the second aspect of the invention, according to the first aspect, the designation section S is capable of designating the recording position by designating a designation position, which corresponds to a predetermined image position in the image data I, on the set medium M1.

According to the aspect, the designation section S is capable of designating the recording position as a result of a designation position, which corresponds to a predetermined image position in the image data I, being designated on the set medium M1. Therefore, by establishing a predetermined image position in advance, it is possible to easily designate a recording position in a single step of designating the designation position with the designation section S.

Additionally, without being particularly limited to "a predetermined image position", for example, it is possible to set the image position 10, which corresponds to the data of a pixel of an end section in the image data I, the image position I1 of a portion that corresponds to a portion of the recording image Pi to be recorded first, or the like.

In the recording apparatus 1 of the third aspect of the invention, according to the first aspect, the reception section 8 that receives an arbitrary image position in the image data I is further included, and the designation section S is capable of designating the recording position by designating a designation position, which corresponds to the arbitrary image position, on the set medium M1.

According to the aspect, the designation section S is capable of designating the recording position as a result of a designation position, which corresponds to an arbitrary image position that the reception section 8 received, being designated. That is, for example, it is possible to designate a preferred recording position of a user as a result of the user designating an arbitrary image position in the image data I on the monitor 23, and designating a designation position, which corresponds to the designated image position, with the designation section S.

In the recording apparatus 1 of the fourth aspect of the invention, according to any one of the first aspect to the third aspect, the designation section S is capable of designating the recording position by designating a first designation position, which corresponds to a first image position in the image data I, and a second designation position, which corresponds to a second image position in the image data I, on the set medium M1.

According to the aspect, the designation section S is capable of designating the recording position as a result of the first designation position, which corresponds to the first image position, and the second designation position, which corresponds to the second image position, being designated on the set medium M1. Therefore, in addition to it being possible to suppress recording position shift of the recording image Pi in accordance with setting position shift of the medium M, it is possible to adjust the recording image Pi to be formed on the set medium M1 to a preferred size and formation angle of a user.

In the recording apparatus 1 of the fifth aspect of the invention, according to any one of the first aspect to the third aspect, the designation section S is capable of designating a first designation position, which corresponds to a first image position in the image data I, and a formation angle of the recording image Pi with respect to the set medium M1.

According to the aspect, the designation section S is capable of designating a first designation position, and a formation angle of the recording image Pi with respect to the set medium M1. For example, by designating a first designation position and a second designation position, it is possible to establish the recording position with the first designation position as a reference. Further, it is possible to establish a formation angle of the recording image Pi with respect to the set medium M1 on the basis of a designation position straight line that links the first designation position and the second designation position, and an image position straight line that links the first image position, which corresponds to the first designation position of the image data I, and a second image position, which corresponds to the second designation position. Therefore, in addition to it being possible to suppress shifting of a recording location of the recording image Pi in accordance with setting position shift of the medium M, it is possible to adjust the recording image Pi to be formed on the set medium M1 to a preferred formation angle of a user.

In the recording apparatus 1 of the sixth aspect of the invention, according to any one of the first aspect to the fifth aspect, the designation section S is the pressure sensor S1 that is provided in the setting section 4 on the setting surface 25 of the medium M, and is capable of designating the recording position as a result of being pressed.

According to the aspect, the designation section S is the pressure sensor S1 that is provided on the setting surface 25, and is capable of designating the recording position of the recording image Pi as a result of being pressed. Therefore, it is possible to easily designate the recording position of the recording image Pi.

In the recording apparatus 1 of the seventh aspect of the invention, according to any one of the first aspect to the fifth aspect, the designation section S is capable of acquiring positional information at a facing position, which faces the setting surface 25 of the medium M in the setting section 4, is capable of transmitting the positional information to the control section 8, and is capable of designating the recording position by transmitting the positional information to the control section 8.

According to the aspect, the designation section S is capable of acquiring positional information at a facing position, which faces the setting surface 25, is capable of transmitting the positional information to the control section 8, and is capable of designating the recording position of the recording image Pi by transmitting the positional information to the control section 8. Therefore, it is possible to easily designate the recording position of the recording image Pi.

Additionally, for example, a configuration that acquires the positional information by transmitting and receiving electromagnetic waves, is given as an example of a configuration "that is capable of acquiring the positional information", but the invention is not particularly limited to such a configuration.

The recording method of the eighth aspect of the invention, is a recording method in a recording apparatus 1 that is provided with a setting section 4 of the medium M, and a recording section 7 that is capable of recording the recording image Pi on the set medium M1 on the basis of the image data I, and the method includes a designation process of designating a recording position of the recording image Pi on the set medium M1, which is the medium M that is set in the setting section 4, and a recording process of recording the recording image Pi in recording position that is designated in the designation step.

According to the aspect, the recording method includes the designation process of designating the recording position of the recording image Pi on the set medium M1, and the recording process of recording the recording image Pi in the recording position that is designated in the designation process. Therefore, even in a case in which setting position shift of the medium M, arises, it is possible to suppress recording position shift of an image in accordance with setting position shift of the medium M by designating the recording position in the designation process. Furthermore, it is also possible to record by changing the recording position to a preferred position of a user as a result of designating the recording position in the designation process.

The entire disclosure of Japanese Patent Application No. 2015-022928, filed Feb. 9, 2015 is expressly incorporated reference herein.

What is claimed is:

1. A recording apparatus comprising:
   a setting tray having a main surface configured to receive a medium;
   a recording head that is configured to eject an ink so as to record a recording image on the medium based on image data;
   a designation pressure sensor that is provided on the main surface of the setting tray and that is configured to detect a recording start position of the recording image, the ink being ejected to the recording start position at a beginning of recording the recording image on the medium; and
   a processor that is configured to cause the recording head to eject the ink to the recording start position to record the recording image on the medium,
   wherein the processor is configured to detect a start Position difference between a reference recording start position and the recording start position which is detected by the destination pressure sensor, and
   the processor is configured to detect a shift state of the medium on the main surface of the setting tray based on the start position difference, and the shift state corresponds to a medium position difference between a reference medium position of the medium and an actual medium position on the main surface of the setting tray.

2. The recording apparatus according to claim 1, wherein the recording start position corresponds to a predetermined part of the image data.

3. The recording apparatus according to claim 1, wherein the processor is configured to recognize a predetermined part of the image data, and
   the recording start position corresponds to the predetermined part of the image data.

4. The recording apparatus according to claim 1, wherein the recording start position is configured with a first designation positon and a second designation position, and
   wherein the designation pressure sensor is configured to detect the first designation position which corresponds to a first image position part of the image data, and the designation pressure sensor is configured to detect the second designation position which corresponds to a second image position part, which is different from the first image position part, of the image data.

5. The recording apparatus according to claim 1, wherein the recording start position is configured with a first designation positon and a second designation position
   wherein the designation pressure sensor is configured to detect the first designation position, which corresponds to a first image position part of the image data,
   the designation pressure sensor is configured to detect the second designation position which corresponds to a second image position part, which is different from the first image position part, of the image data, and
   wherein the processor is configured to detect a formation angle of the recording image with respect to the medium on the main surface of the setting tray based on the first and second designation positions.

6. The recording apparatus according to claim 1, wherein the designation pressure sensor is configured to detect the recording start position as a result of being pressed by an object on the medium located on the main surface of the setting tray.

7. A recording method in a recording apparatus the recording apparatus includes:
   a setting tray having a main surface configured to receive a medium;
   a recording head that is configured to eject an ink so as to record a recording image on the medium based on image data;
   a designation pressure sensor that is provided on the main surface of the setting tray and that is configured to detect a recording start position of the recording image, the ink being ejected to the recording start position at a beginning of recording the recording image on the medium; and
   a processor that is configured to cause the recording head to eject the ink to the recording start position to record the recording image on the medium, the method for causing the processor to execute a process, the method comprising executing the processor the steps of:
   designating the recording start position of the recording image on medium; and
   ejecting the ink on the medium starting from the recording start position to record the recording image on the medium,
   wherein the processor is configured to detect a start position difference between a reference recording start position and the recording start position which is detected by the destination pressure sensor, and
   the processor is configured to detect a shift state of the medium on the main surface of the setting tray based on the start position difference, and the shift state corresponds to a medium position difference between a reference medium position of the medium and an actual medium position on the main surface of the setting tray.

* * * * *